(12) United States Patent
Grumer et al.

(10) Patent No.: US 9,464,589 B2
(45) Date of Patent: Oct. 11, 2016

(54) SYSTEM AND METHOD FOR ALERTING AND SUPPRESSION OF DETONATION AND/OR PRE IGNITION PHENOMENA IN INTERNAL COMBUSTION ENGINES BY MONITORING RPM FLUCTUATION

(71) Applicant: ISRAEL AEROSPACE INDUSTRIES LTD., Lod (IL)

(72) Inventors: Bernard Grumer, Herzeliya (IL); Nathan Levy, Modiin (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 0 days.

(21) Appl. No.: 14/975,919

(22) Filed: Dec. 21, 2015

(65) Prior Publication Data

US 2016/0102625 A1   Apr. 14, 2016

Related U.S. Application Data

(63) Continuation of application No. 14/373,753, filed as application No. PCT/IL2012/050502 on Dec. 4, 2012, now Pat. No. 9,261,039.

(30) Foreign Application Priority Data

Feb. 15, 2012   (IL) .......................................... 218127

(51) Int. Cl.
*F02D 41/22* (2006.01)
*G01M 15/11* (2006.01)
(Continued)

(52) U.S. Cl.
CPC .............. *F02D 41/22* (2013.01); *B64D 27/04* (2013.01); *B64D 31/00* (2013.01); *B64D 31/06* (2013.01); *F02D 35/02* (2013.01); *F02D 35/024* (2013.01);
(Continued)

(58) Field of Classification Search
CPC .... F02D 41/22; F02D 35/024; F02D 35/027; F02P 5/152; G01M 15/046; G01M 15/11
USPC ............ 701/111, 110, 102, 103; 123/406.24, 123/406.21, 406.29; 73/35.01, 35.03, 35.04
See application file for complete search history.

(56) References Cited

U.S. PATENT DOCUMENTS

| 4,461,257 A | 7/1984 | Hosaka et al. |
| 4,694,800 A | 9/1987 | Morita |

(Continued)

FOREIGN PATENT DOCUMENTS

| DE | 10343146 A1 | 4/2005 |
| DE | 102009008248 A1 | 8/2010 |
| JP | 2000240500 A | 9/2000 |

OTHER PUBLICATIONS

Supplementary European Search Report of EP 12868864 of Sep. 10, 2015.

(Continued)

*Primary Examiner* — Mahmoud Gimie
(74) *Attorney, Agent, or Firm* — Browdy and Neimark, PLLC (57) ABSTRACT

An engine system with advance detection of detonation and/or pre ignition, the system comprising an engine, operative for propulsion of a vehicle by generating rotational motion, whose rotational velocity over time is monitored; and a detonation and/or pre ignition detector operative to provide an alert for impending detonation and/or pre ignition of the engine, if the rotational velocity fluctuates over time to an extent which is predetermined to be unsafe.

22 Claims, 2 Drawing Sheets

(51) Int. Cl.
*F02P 5/152* (2006.01)
*F02D 35/02* (2006.01)
*G01M 15/04* (2006.01)
*F02D 41/14* (2006.01)
*F02D 41/26* (2006.01)
*F02D 37/02* (2006.01)
*F02D 41/00* (2006.01)
*B64D 31/00* (2006.01)
*B64D 27/04* (2006.01)
*B64D 31/06* (2006.01)
*F02P 5/04* (2006.01)

(52) U.S. Cl.
CPC ............. *F02D 35/027* (2013.01); *F02D 37/02* (2013.01); *F02D 41/0007* (2013.01); *F02D 41/0097* (2013.01); *F02D 41/1497* (2013.01); *F02D 41/263* (2013.01); *F02D 41/266* (2013.01); *F02P 5/152* (2013.01); *G01M 15/046* (2013.01); *G01M 15/11* (2013.01); *F02D 2200/1012* (2013.01); *F02P 5/045* (2013.01); *Y02T 10/144* (2013.01)

(56) References Cited

U.S. PATENT DOCUMENTS

| | | |
|---|---|---|
| 4,987,770 A | 1/1991 | Nanyoshi et al. |
| 5,639,960 A | 6/1997 | Nakagawa |
| 7,133,766 B2 | 11/2006 | Kokubo |
| 2003/0060962 A1* | 3/2003 | Carroll ................. B64C 39/024 701/103 |
| 2005/0056254 A1 | 3/2005 | Wozniak |
| 2005/0268886 A1 | 12/2005 | Etou et al. |
| 2009/0314883 A1 | 12/2009 | Arlton |
| 2011/0202260 A1 | 8/2011 | Cunningham |
| 2011/0224882 A1 | 9/2011 | Makino |
| 2011/0229809 A1 | 9/2011 | Nukada |
| 2011/0313641 A1 | 12/2011 | Glugla et al. |

OTHER PUBLICATIONS

Wikipedia, the free encyclopedia. "Internal combustion engine" http://en.wikipedia.orglw/index.php?title=Internal_combustion_engine&oldid=47414 . . . 1-19 (Jan. 2012).

Wikipedia, the free encyclopedia. "Throttle" http://en.wikipedia.org/w/index.php?title=Throttle&oldid=457213533 1-3 (Oct. 2011).

Wikipedia, the free encyclopedia. "Engine Knocking" http://en.wikipedia.org/w/index.php?title=Engine k: nocking &oldid=47331558! 1-5 (Jan. 2012).

Wikipedia, the free encyclopedia. "Automatic Performance Control" http://en.wikipedia.orglw/index.php?title=Automatic Performance_Control&oldid=4 . . . 1-2 (Jun. 2011).

Wikipedia, the free encyclopedia. "ROTAX 914" http://en.wikipedia.org/w/index.php?title=Rotax_914&oldid=4660093 31. 1-3 (Dec. 2011).

SRM Engine Suite "Spark ignition, cmcl innovations" http://www.emelinnovations.eom/?page id=216. 1-2 (Sep. 2014).

* cited by examiner

Fig. 1

Fig. 2

SYSTEM AND METHOD FOR ALERTING AND SUPPRESSION OF DETONATION AND/OR PRE IGNITION PHENOMENA IN INTERNAL COMBUSTION ENGINES BY MONITORING RPM FLUCTUATION

REFERENCE TO CO-PENDING APPLICATIONS

Priority is claimed from Israeli Patent Application No. 218127, entitled "System and Method for Alerting and Suppression of Detonation and/or Pre Ignition Phenomena in Internal Combustion Engines by Monitoring RPM Fluctuation" and filed on Feb. 15, 2012.

FIELD OF THE INVENTION

The present invention relates generally to detonation and more particularly to alerting for detonation and pre ignition.

BACKGROUND OF THE INVENTION

Conventional technology pertaining to certain embodiments of the present invention includes:

Detonation or pre ignition typically manifests as an "explosion" or uncontrolled ignition instead of controlled burning of the fuel air mixture inside a combustion chamber. Detonation, pre ignition or "knock" is detected in car engines using a "knocking" i.e. acoustic sensor.

A piston engine has a piston that moves when pressure is applied, and valves to control intake and exhaust of contents of the cylinder. In an internal combustion engine, air and fuel are drawn inward and ignited, such that the air and fuel push on the piston trying to escape. In contrast, in a steam engine, the inlet valve opens, and steam under pressure pushes on the piston, until the exhaust valve opens to let the steam under pressure out.

According to Wikipedia, in an internal combustion engine the combustion of a fuel (normally a fossil fuel) occurs with an oxidizer (usually air) in a combustion chamber. The expansion of the high-temperature and high-pressure gases produced by combustion apply direct force to some component of the engine e.g. pistons, turbine blades, or a nozzle. This force moves the component over a distance, transforming chemical energy into useful mechanical energy. Usually combustion is intermittent, such as the four-stroke and two-stroke piston engines, the six-stroke piston engine and the Wankel rotary engine. A second class of internal combustion engines uses continuous combustion: gas turbines, jet engines and most rocket engines.

According to Wikipedia, a throttle is the mechanism by which the flow of a fluid is managed by constriction or obstruction. An engine's power can be increased or, more usually, decreased by restriction of inlet gases (e.g. by use of a throttle including any mechanism by which the power or speed of an engine is regulated). What is often termed a throttle (in an aviation context) is sometimes called a thrust lever. In a gasoline internal combustion engine, the throttle is a valve that directly regulates the amount of air entering the engine, indirectly controlling the charge (fuel+air) burned on each cycle due to the fuel-injector or carburetor maintaining a relatively constant fuel/air ratio. In a motor vehicle the control used by the driver to regulate power is sometimes called the throttle pedal or accelerator.

According to Wikipedia, the throttle valve may be controlled with a throttle pedal or lever via a direct mechanical linkage. In a reciprocating-engine aircraft, the throttle control is usually a hand-operated lever or knob. The hand-operated lever or knob controls the engine power, which may or may not result in a change of RPM, depending on propeller installation (fixed-pitch or constant speed).

According to Wikipedia, mechanisms are known to detect knocking and adjust timing or boost pressure accordingly in order to offer improved performance on high octane fuels while reducing the risk of engine damage caused by knock while running on low octane fuels. An early example of this is in turbo charged Saab H engines, where a system called Automatic Performance Control was used to reduce boost pressure if it caused the engine to knock.

According to Wikipedia, Automatic Performance Control (APC) was the first engine knock and boost control system that was introduced on turbo charged Saab H engines in 1982 and was fitted to all subsequent 900 Turbo's through 1993 (and 1994 convertibles), as well as 9000 Turbo's through 1989. The APC controls boost pressure—specifically, the rate of rise and maximum boost level—and it detects and manages harmful knock events. To control the turbocharger, the APC monitors the engine's RPM and inlet manifold pressure via a pressure transducer, and uses these inputs to control a solenoid valve that trims the rate of rise of pressure as well as the maximum pressure by directing boost pressure to the turbocharger's pneumatic waste gate actuator.

According to Wikipedia, to detect knock, a piezoelectric knock sensor (basically a microphone) bolted to the engine block responds to unique frequencies caused by engine knock. The sensor generates a small voltage that is sent to the electronic control unit, which processes the signal to determine if, in fact, knock is occurring. If it is, then the control unit activates a solenoid valve that directs boost pressure out of the turbochargers pneumatically controlled waste gate actuator, which opens the waste gate to bypass exhaust gases from the turbocharger directly to the exhaust pipe, lowering turbo boost pressure until the knock subsides. Knock events that are managed by the APC can be "seen" when the in-dash boost needle "twitches" slightly. The APC unit has a 'knock' output where a LED may be connected. This LED will then light up if knock is detected. The pictured APC gauge has this custom LED fitted at the end of the red scale. Because the knock sensor becomes less accurate at high revolutions, the APC tapers maximum boost pressure after approximately 4,500 RPM.

According to Wikipedia, avoidance of knocking combustion motivated a variety of simulation technologies which can identify engine design or operating conditions in which knock might be expected to occur. This then enables engineers to design ways to mitigate knocking combustion whilst maintaining a high thermal efficiency. Since the onset of knock is sensitive to the in-cylinder pressure, temperature and pre ignition chemistry associated with the local mixture compositions within the combustion chamber, simulations which account for all of these aspects have thus proven most effective in determining knock operating limits and enabling engineers to determine the most appropriate operating strategy.

SRM suite combustion software, distributed by Computational Modeling Cambridge Ltd., Sheraton House, Castle Park, Cambridge, CB3 0AX United Kingdom is said to employ "advanced combustion models specifically for the application to Spark Ignition (SI) engine combustion. These models can be used to study . . . auto-ignition chemistry leading to engine knock."

The disclosures of all publications and patent documents mentioned in the specification, and of the publications and patent documents cited therein directly or indirectly, are hereby incorporated by reference.

SUMMARY OF THE INVENTION

Certain embodiments of the present invention seek to provide a system for alerting for detonation by detecting RPM fluctuation.

Certain embodiments of the present invention seek to prevent detonation and/or pre ignition—causing destruction of an internal combustion engine, which may reside in a vehicle, such as but not limited to prevention of engine cut in engines such as piston engines as a result of detonation and/or pre ignition.

Certain embodiments of the present invention seek to provide a method for saving air vehicles from engine cuts during flights which may result in crash landings.

Certain embodiments of the present invention seek to provide a method for alerting for detonation and/or pre ignition by monitoring for RPM fluctuation including at least one of the magnitude and frequency of such fluctuation.

Certain embodiments of the present invention seek to provide a method for calibrating a general detonation and/or pre ignition detection method to fit a particular motor, so as to provide a low rate of false alarms and a low rate of failure to detect real detonation.

Certain embodiments of the present invention seek to provide a method for preventing or retarding detonation and/or pre ignition in an engine e.g. by performing a detonation and/or pre ignition retarding action e.g. automatic or manual throttle position reduction, responsive to a detonation and/or pre ignition alert provided by monitoring for RPM fluctuation in the engine. It is appreciated that providing the engine operator with a detonation and/or pre ignition warning allows her or him to manually reduce the throttle position.

Advantages include enhanced safety and cost effectiveness relative to conventional knock sensors.

According to certain embodiments, engine temperature is also monitored and if a rise in engine temperature is detected, this strengthens the level of confidence that detonation and/or pre ignition is impending, whereas if no rise in engine temperature is detected, this weakens the level of confidence that detonation and/or pre ignition is impending. It is appreciated that a rise in engine temperature may occur due to other reasons.

According to Wikipedia, the Rotax 914 engine is a turbo-charged, four-cylinder, horizontally opposed aircraft engine with air-cooled cylinders and water-cooled cylinder heads. It commonly powers aircraft including UAVs. Certain embodiments of the present invention are applicable inter alia to other vehicles e.g. air vehicles using a Rotax 914 engine, and are also suitable for other internal combustion engines not equipped with knock sensors. More generally, embodiments of this invention pertain to internal combustion engines such as but not limited to piston engines, which may be used in any suitable application e.g. manned and unmanned aircraft, rockets, cars, trains and trams, sea vehicles including submarines, manufacturing facilities and so forth.

There is thus provided, in accordance with at least one aspect of the presently disclosed subject matter, an engine system with advance detection of detonation and/or pre ignition, the system comprising:

An engine, operative for propulsion of a vehicle by generating rotational motion, whose rotational velocity over time is monitored; and a detonation and/or pre ignition detector operative to provide an alert for impending detonation and/or pre ignition of the engine, if the rotational velocity fluctuates over time to an extent which is predetermined to be unsafe.

There is thus further provided, in accordance with at least one embodiment of the presently disclosed subject matter, a system wherein a rotational velocity fluctuation pattern is predetermined to be safe if local fluctuations of the rotational velocity never exceed a threshold value.

There is thus further provided, in accordance with at least one embodiment of the presently disclosed subject matter, a system wherein a rotational velocity fluctuation pattern is predetermined to be unsafe if local fluctuations of the rotational velocity exceed a threshold value at least a predetermined number of times within a predetermined time window.

There is thus further provided, in accordance with at least one embodiment of the presently disclosed subject matter, a system wherein the threshold value comprises 60 rpm.

There is thus yet further provided, in accordance with at least one embodiment of the presently disclosed subject matter, a system wherein the predetermined time window comprises 10 sec.

There is thus further provided, in accordance with at least one embodiment of the presently disclosed subject matter, a system wherein a rotational velocity fluctuation pattern is predetermined to be safe if fluctuations of the rotational velocity within a time slot whose size is 770 millisec+−25%, never exceed a threshold value.

There is thus yet further provided, in accordance with at least one embodiment of the presently disclosed subject matter, a system wherein a rotational velocity fluctuation pattern is predetermined to be unsafe if fluctuations of the rotational velocity within a time slot whose size is 770 millisec+−25%, exceed a threshold value at least a predetermined number of times within a predetermined time window.

There is thus yet further provided, in accordance with at least one embodiment of the presently disclosed subject matter, a system which also comprises a detonation and/or pre ignition retardation functionality which is activated responsive to the alert.

There is thus yet further provided, in accordance with at least one embodiment of the presently disclosed subject matter, a system wherein a throttle regulates the engine's power depending on the throttle's range and wherein the detonation and/or pre ignition retardation functionality comprises a throttle reducer operative to reduce the throttle's range, responsive to the alert.

There is thus yet further provided, in accordance with at least one embodiment of the presently disclosed subject matter, a system wherein the detonation detector is activated only if the throttle's range is above 60%.

There is thus yet further provided, in accordance with at least one embodiment of the presently disclosed subject matter, a system wherein the detonation and/or pre ignition detector is operative to determine whether or not the rotational velocity is fluctuating over time to an extent predetermined to be unsafe, once every 70 milliseconds.

There is thus yet further provided, in accordance with at least one embodiment of the presently disclosed subject matter, a system wherein the predetermined number of times comprises 3-5 times in 10 seconds.

There is thus yet further provided, in accordance with at least one embodiment of the presently disclosed subject matter, a system and also comprising an aircraft and wherein the engine is operative to airlift the aircraft.

There is thus yet further provided, in accordance with at least one embodiment of the presently disclosed subject matter, a system wherein the throttle reducer is operative to reduce the throttle's range to below a threshold value of between 60% and 70%, responsive to the alert.

There is thus yet further provided, in accordance with at least one embodiment of the presently disclosed subject matter, a system wherein the rotational velocity of the engine is recorded by an external monitor and is accessed by the detonation and/or pre ignition detector.

There is thus yet further provided, in accordance with at least one embodiment of the presently disclosed subject matter, a system comprising an external monitor recording the rotational velocity of the engine for provision to the detonation and/or pre ignition detector.

There is thus yet further provided, in accordance with at least one embodiment of the presently disclosed subject matter, a system wherein the external monitor comprises an on-board computer controlling a vehicle motorized by the engine.

There is thus yet further provided, in accordance with at least one embodiment of the presently disclosed subject matter, a system wherein the external monitor comprises a computerized control center, which is remote from and which controls a vehicle motorized by the engine, and wherein the computerized control center receives engine rotational velocity information from an on-board RPM sampler.

There is thus yet further provided, in accordance with at least one embodiment of the presently disclosed subject matter, a system wherein the aircraft comprises a UAV (unmanned aerial vehicle).

There is thus yet further provided, in accordance with at least one aspect of the presently disclosed subject matter, a system for advance detection of detonation and/or pre ignition in an engine, the system comprising:

a detonation and/or pre ignition detector operative to provide an alert for impending detonation and/or pre ignition of an engine generating rotational motion whose rotational velocity over time is monitored, if the rotational velocity fluctuates over time to an extent which is predetermined to be unsafe.

There is thus yet further provided, in accordance with at least one embodiment of the presently disclosed subject matter, a system comprising an engine generating rotational motion whose rotational velocity over time is monitored.

There is thus yet further provided, in accordance with at least one embodiment of the presently disclosed subject matter, a system comprising a vehicle propelled by the engine.

There is thus yet further provided, in accordance with at least one aspect of the presently disclosed subject matter, a method for advance detection of detonation and/or pre ignition in an engine, the method comprising:

providing an alert for impending detonation and/or pre ignition of an engine generating rotational motion whose rotational velocity over time is monitored, if the rotational velocity fluctuates over time to an extent which is predetermined to be unsafe.

There is thus yet further provided, in accordance with at least one aspect of the presently disclosed subject matter, a method for operating aircraft with advance detection of detonation and/or pre ignition, the method comprising:

Providing an engine airlifting a structure capable of being airborne by generating rotational motion whose rotational velocity over time is monitored; and Providing an alert for impending detonation and/or pre ignition of the engine, if the rotational velocity fluctuates over time to an extent which is predetermined to be unsafe.

There is thus yet further provided, in accordance with at least one embodiment of the presently disclosed subject matter, a system wherein the engine comprises a Rotax 914 engine.

There is thus yet further provided, in accordance with at least one embodiment of the presently disclosed subject matter, a system wherein the detonation and/or pre ignition detector resides on-board the vehicle.

There is thus yet further provided, in accordance with at least one embodiment of the presently disclosed subject matter, a system wherein the engine is operative to propel a vehicle, the system also comprising a vehicle control station remote from the vehicle and wherein the detonation and/or pre ignition detector resides within the vehicle control station.

There is thus yet further provided, in accordance with at least one embodiment of the presently disclosed subject matter, a system comprising an aircraft control station operative to control the structure capable of being airborne from the ground, and wherein the detonation and/or pre ignition detector resides within the aircraft control station.

There is thus yet further provided, in accordance with at least one embodiment of the presently disclosed subject matter, a system wherein the aircraft control station comprises a UAV ground control station operative to control a UAV and wherein the engine is operative for airlifting the UAV by generating rotational motion whose rotational velocity over time is monitored.

There is thus yet further provided, in accordance with at least one embodiment of the presently disclosed subject matter, a system wherein the engine comprises an internal combustion engine.

There is thus yet further provided, in accordance with at least one embodiment of the presently disclosed subject matter, a system wherein the internal combustion engine comprises a piston engine.

There is thus yet further provided, in accordance with at least one aspect of the presently disclosed subject matter, a computer program product, comprising a computer usable medium having a computer readable program code embodied therein, the computer readable program code adapted to be executed to implement a method for advance detection of detonation and/or pre ignition in an engine, the method comprising:

Providing an alert for impending detonation and/or pre ignition of an engine generating rotational motion whose rotational velocity over time is monitored, if the rotational velocity fluctuates over time to an extent which is predetermined to be unsafe.

There is thus yet further provided, in accordance with at least one embodiment of the presently disclosed subject matter, a system wherein the detonation and/or pre ignition detector resides on a computer which generates RPM and throttle information.

There is thus yet further provided, in accordance with at least one embodiment of the presently disclosed subject matter, a system wherein the computer which generates RPM and throttle information comprises an engine controller.

Also provided is a computer program comprising computer program code means for performing any of the methods shown and described herein when said program is run on a computer; and a computer program product, comprising a typically non-transitory computer-usable or -readable medium or computer readable storage medium, typically tangible, having a computer readable program code embodied therein, said computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a typically non-transitory computer readable storage medium.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein, such as but not limited to steps of flowcharts, may be performed by a conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer or processor. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may where ever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor may be employed to compute or generate information as described herein e.g. by providing one or more modules in the processor to perform functionalities described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Certain embodiments of the present invention are illustrated in the following drawings.

Computational components described and illustrated herein can be implemented in various forms, for example, as hardware circuits such as but not limited to custom VLSI circuits or gate arrays or programmable hardware devices such as but not limited to FPGAs, or as software program code stored on at least one intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Data can be stored on one or more intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

A periodical sampling of throttle and RPM report is typically transmitted from a UAV to a ground station. Sampling on the UAV may be performed at suitable intervals, e.g. in a Rotax 914 engine, each wave length, and, in the recording system, each 70 milliseconds. The RPM information may, for example, be provided by the Rotax 914's native RPM sensor. Each cycle of the crankshaft typically submits a signal to an engine controller which computes the engine RPM. The engine controller typically reports the actual RPM of the engine to a main computer.

When the throttle is opened more than a threshold level e.g. 60%, and typically only under that circumstance, software functionality may be activated. The software searches in a time slot of, say, 770 milliseconds for minimum and maximum RPM readings provided e.g. in the RPM report of the RPM sensor. The software functionality typically finds a difference between Minimum and maximum values in an rpm report for a particular time slot, and compares the difference to a suitable threshold value e.g. the minimum bit sampling e.g. 32 rpm for the Rotax 914.

According to one embodiment, frequency of occurrence of temporally adjacent but disparate rpm values is a criterion for alerting for detonation and/or pre ignition.

According to one embodiment, frequency of occurrence of temporally adjacent but disparate rpm values, combined with the size of the difference, forms a compound criterion for alerting for detonation. For example, a huge discrepancy which occurs even relatively infrequently, would alert for detonation and/or pre ignition, whereas a medium-high discrepancy would alert for detonation and/or pre ignition only if such medium-high discrepancy recurred often.

If in a time window of (say) 10 seconds, the software functionality detects 4 (say) instances of max and min RPM discrepancy within a 770 milliseconds (say) time slot, a UAV or another vehicle operator typically receives a detonation and/or pre ignition warning. Upon receiving this warning, the UAV operator, or an automatic control responsive to such warning, may perform a suitable detonation and/or pre ignition retarding action such as retarding ignition and/or opening the turbo waste gate and/or reducing the throttle position e.g. to below a predetermined detonation and/or pre ignition-retarding or -terminating level e.g. 60%. This action typically terminates or reduces the detonation and/or pre ignition phenomena. It is appreciated that reducing a throttle setting automatically may lead to descent of the aircraft, thereby putting the UAV in danger.

For example, an at least 2 bit (64 RPM) fluctuation in local (within 770 millisec) minimal or maximal values, occurring, say, 4 times (e.g. over at least 4 770-millisec time frames) within 10 seconds (11 RPM sampling frames×70 milliseconds per sample) may trigger the system.

According to one embodiment, if in the 10 seconds (say) following the last detonation and/or pre ignition alert there is not a new detonation and/or pre ignition alert, and/or if there are less than (say) cases of max and min RPM in 770 milliseconds, the program returns to normal mode e.g. a detonation and/or pre ignition suspicion counter resets to zero and the detonation and/or pre ignition alert disappears. Typically, if in the following 10 seconds (say) there is a second detonation and/or pre ignition alert;—the detonation and/or pre ignition alert is kept on.

The program was tested during flights. At least 4 cases of detonation and/or pre ignition were detected successfully.

Optionally, for manned aircraft, it is possible to provide a temporal sequence of more than one alert where the last alert, provided typically if initial detonation and/or pre ignition retardation attempts are not successful, signals that the pilot should seek an immediate landing.

Figure 1:
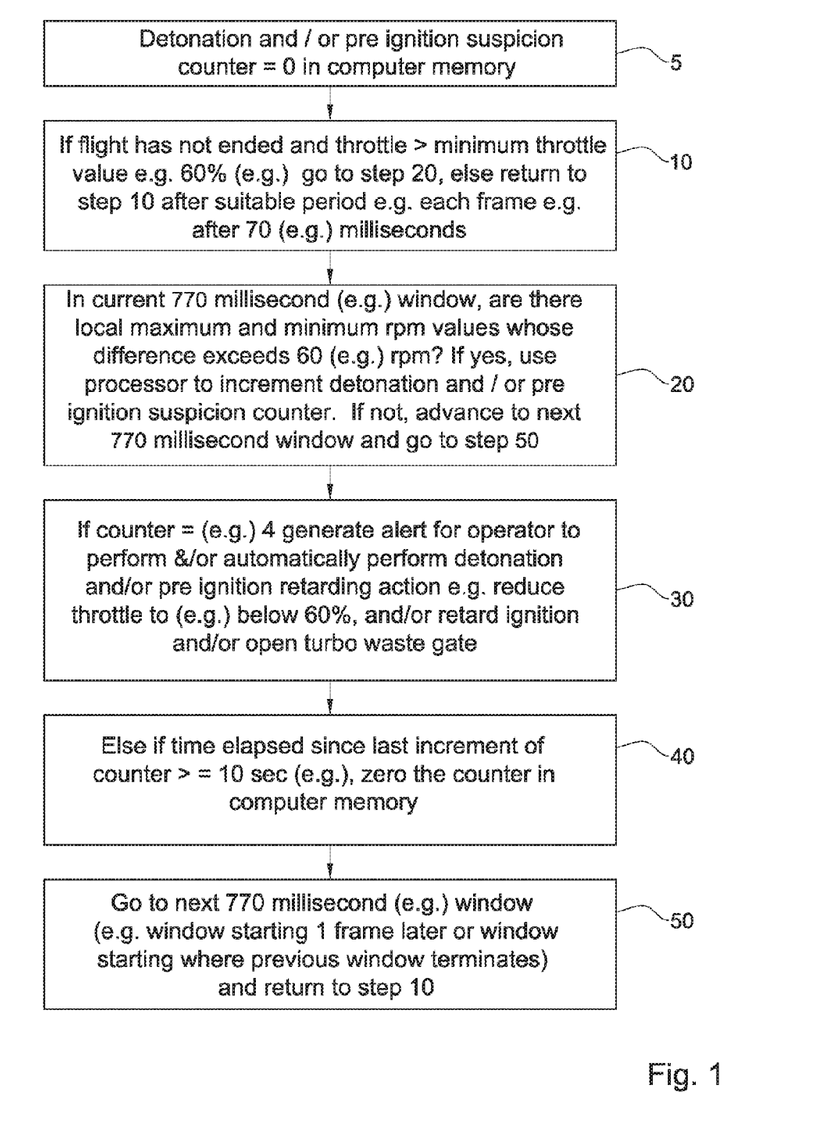
FIG. 1 illustrates a simplified flowchart illustration of a method for predicting detonation and/or pre ignition in an engine by detecting rpm fluctuation in same engine, which method is operative in accordance with certain embodiments of the present invention.

FIG. 1 is a simplified flowchart illustration of an example method for predicting detonation and/or pre ignition in an engine by detecting rpm fluctuation in same engine, which is particularly suited to a UAV-mounted Rotax 914 engine. The method of FIG. 1 typically comprises some or all of the following steps, suitably ordered e.g. as shown:

Step 5. Set Detonation and/or pre ignition suspicion counter=0 in computer memory.

Step 10. If flight has not ended and throttle>60% (e.g.) go to step 20, else return to step 10 after suitable period e.g. each frame e.g. after 70 (e.g.) milliseconds.

Step 20. In current 770 millisecond (e.g.) window, are there local minimum and local maximum points whose rpm values differ by at least 60 (e.g.) rpm? If yes, use processor to increment detonation and/or pre ignition suspicion counter and go to step 30. If not, advance to next 770 millisecond window and go to step 50.

Step 30. If counter=(e.g.) 4, generate alert for operator to perform &/or automatically perform detonation and/or pre ignition retarding action e.g. reduce throttle to (e.g.) below 60%, and/or retard ignition and/or open turbo waste gate and continue to step 40. Else go to step 50.

Step 40. If time elapsed since last increment of counter>=10 sec (e.g.), zero the counter in computer memory.

Step 50. Go to next 770 millisecond (e.g.) window (e.g. window starting 1 frame later or window starting where previous window terminates) and return to step 10.

The detonation and/or pre ignition detector shown and described herein may comprise a software functionality which communicates with or is incorporated within an on-board computer of a vehicle e.g. aircraft e.g. UAV and/or a computerized control center controlling a vehicle from afar e.g. a ground control station controlling a UAV remotely. The detonation and/or pre ignition detector shown and described herein may access rotational velocity data directly from a communication channel between a vehicle and a computerized control center controlling a vehicle from afar. An existing system for recording vehicle data including engine rotational velocity may be modified to provide the engine rotational velocity data directly to a detonation and/or pre ignition detector as shown and described herein.

It is appreciated that the particular parameters used in FIG. 1 are merely exemplary and are not intended to be limiting. For example, in step 10, the minimum throttle value need not be 60%, or in fact the condition of performing certain steps only if a minimum throttle value is exceeded may be eliminated entirely. In step 30, throttle reduction may be to 70% rather than 60%, the 770 millisecond window may be +−25% in size, and the condition for step 30 may be that the counter reaches 3 or 5 rather than 4, and similarly, other parameter values may be selected to be other than as in FIG. 1.

It is appreciated that a 60 rpm discrepancy is a suitable parameter for systems where each bit is 30 rpm; such that for many or most applications, a 1 bit discrepancy is too small and will cause false alarms, and a discrepancy of 3 or more bits is too large and will result in false negatives. In systems with a different rpm/bit resolution, any other suitable value which creates a good balance, considering the application, between type 1 detection errors and type 2 detection errors may be employed.

The 10 sec parameter of FIG. 1 is selected mindful of the amount of time between when detonation and/or pre ignition begins to occur, and until when the engine is destroyed or unacceptably harmed, which may for example be a period of time of approximately 40-50 sec. Also pertinent is the amount of time required for an operator or automatic functionality to respond to the detonation and/or pre ignition alert, which may for example be approximately 5 sec for a human operator. Also pertinent is the amount of time required for the detonation and/or pre ignition retardation action to sufficiently retard detonation and/or pre ignition so as to avoid engine damage; for throttle reduction and given the above engine, this amount of time is almost instantaneous however in other applications this may not be the case. For the Rotax engine, the 10 sec parameter may if desired be modified to 15 or 20 or 25 sec, or intervening values in this range.

It is appreciated that the particular steps of FIG. 1 are not intended to be limiting and may be modified or omitted, for the Rotax engine or any other. For example, there may be different RPM fluctuation frequency thresholds for very high RPM fluctuation amplitudes, than for only medium high RPM fluctuation amplitudes (say, 2 occurrences instead of 4 occurrences). Alternatively or in addition, the counter may not immediately be zeroed, and may instead merely be decremented somewhat, if an almost-threshold number of or amplitude of RPM fluctuations were identified, or another logic may be employed to take into account repeated almost-threshold occurrences of RPM fluctuation. Alternatively or in addition, other external events such as but not limited to throttle actions may be monitored and may affect the logic. Regarding step 20, the next window may start at a point in time which immediately follows the first or last 2 RPM values in the current window whose difference exceeds 60 (e.g.) rpm. Alternatively, any other starting point may be employed for subsequent windows, even a starting point which is defined relative to the previous window irrespective of which fluctuations were or were not found therein. For example, the starting point of the (i+1)th 770 millisecond window may even be the endpoint of the i-th 770 millisecond window. Also, opening of a subsequent window may or may not be triggered by increment of the counter. Finally, aspects of the method such as but not limited to the starting point of a subsequent window or the triggering thereof, may be determined as a function of the rate of increment of the counter.

Generally, in order to parameterize and/or modify the method of FIG. 1 for a given engine, a recording for the RPM and throttle of the new engine is obtained, for at least one and preferably several occurrences of detonation and/or pre ignition syndrome.

Recordings of engine operation parameters preceding detonation and/or pre ignition occurrences from the past may be examined. Suitable parameters and logical conditions e.g. as described herein, from such recordings, may be used to retroactively detect occurrence of detonation and/or pre ignition using only recordings generated before the engine was endangered. Parameters or logical conditions described herein may then be systematically varied or combined, to ascertain whether better (less type 1 and/or type 2 errors) or earlier detection may thus occur.

Typically, the parameterization of the method takes into account the time period available to detect detonation and/or pre ignition before the engine is endangered, counting from when the detonation and/or pre ignition actually begins, which may be approximately 30-40 sec, depending on various factors such as the severity of the detonation and/or pre ignition and depending on the particular motor.

If available, prior data recordings on the engine to be calibrated, showing the engine's functioning prior to 2-10 instances of detonation and/or pre ignition, may be used for parameterization of the method of FIG. 1 or modification thereof. However, if no data or an insufficient amount of data is available showing the engine succumbing to detonation and/or pre ignition, a detonation and/or pre ignition or near-detonation and/or pre ignition phenomena can be artificially generated, e.g. by adjusting the fuel mixture fed to the engine and/or by causing high boost pressure throttle and the parameters of rpm fluctuation which are most predictive of such detonation and/or pre ignition are then identified e.g. by systematically varying the parameter values of the set of parameters utilized by FIG. 1 and determining which set of parameter values best predicts the detonation and/or pre ignition. For example, a fuel mixture with a low octane or proportion of fuel may be fed to the engine to artificially generate detonation and/or pre ignition if no recordings of natural occurrences of such as available for a given engine.

Figure 2:
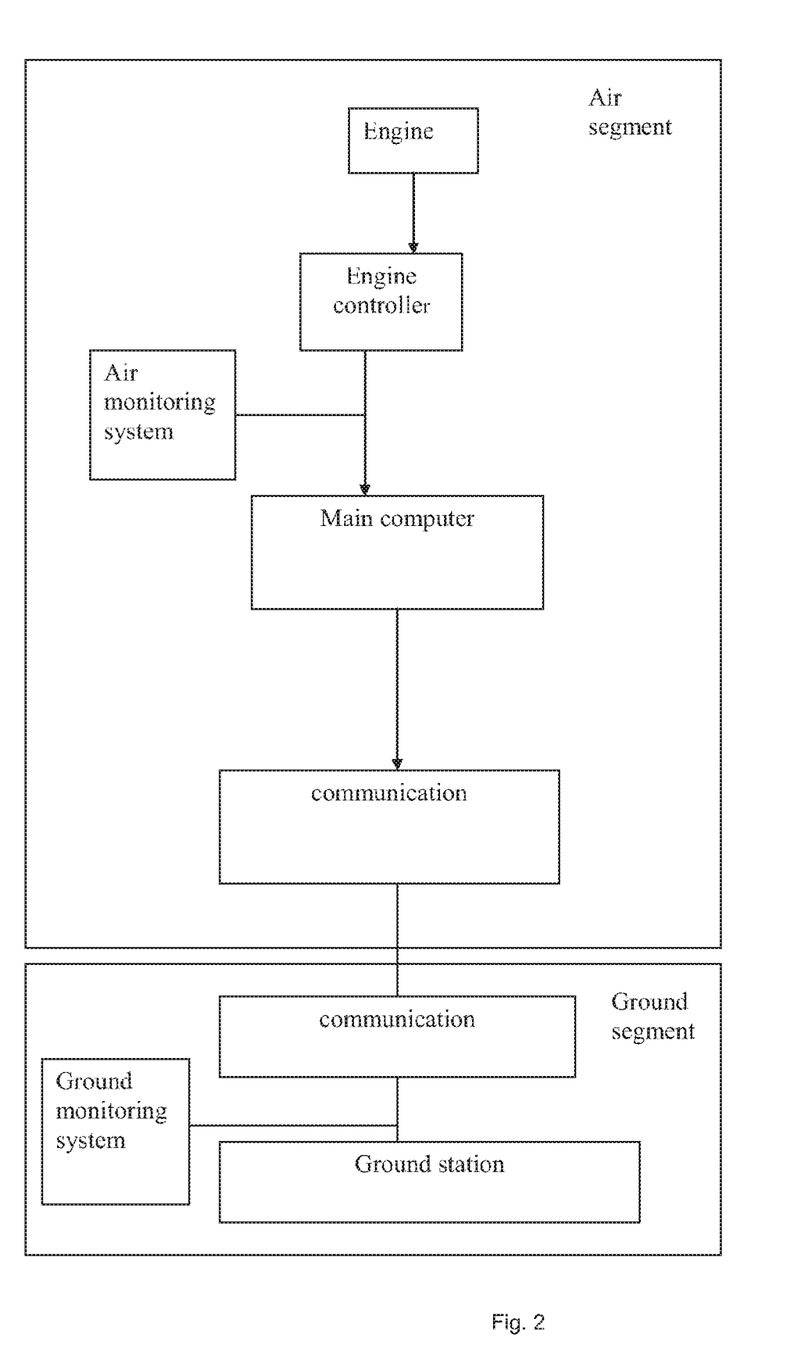
FIG. 2 illustrates a system operative to run the method of FIG. 1, which system is constructed and operative in accordance with certain embodiments of the present invention.

FIG. 2 illustrates an aircraft control system operative to run the method of FIG. 1, which system is constructed and operative in accordance with certain embodiments of the present invention. The functionality of the method of FIG. 1 may reside, wholly or in part, in the main computer of the air segment and/or in the ground monitoring system in the ground segment. It is appreciated that the applicability of the method of FIG. 1 is not limited to aircraft control systems.

It is appreciated that terminology such as "mandatory", "required", "need" and "must" refer to implementation choices made within the context of a particular implementation or application described here within for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

Conversely, features of the invention, including method steps, which are described for brevity in the context of a single embodiment or in a certain order may be provided separately or in any suitable sub combination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps there within, and functionalities described or illustrated as methods and steps there within can also be provided as systems and sub-units thereof. The scale used to illustrate various elements in the drawings is merely exemplary and/or appropriate for clarity of presentation and is not intended to be limiting.

The invention claimed is:

1. An engine system with advance detection of detonation and/or pre ignition, the system comprising:
   a turbocharged engine comprising a turbo waste gate, the turbocharged engine being operative for propulsion of a vehicle by generating rotational motion, whose rotational velocity over time is monitored; and
   a detonation and/or pre ignition detector operative to provide an alert for impending detonation and/or pre ignition of the engine, if the rotational velocity over a plurality of rotational cycles of said rotational motion fluctuates over time with a frequency which is predetermined to be unsafe, and
   a control coupled to said detonation and/or pre ignition detector and configured for selectively operating said turbo waste gate responsive to said alert being provided.

2. A system according to claim 1, wherein said control is operative for opening said turbo waste gate responsive to said alert being provided.

3. A system according to claim 1 wherein a rotational velocity fluctuation pattern is predetermined to be safe if at least one of:
   local fluctuations of the rotational velocity never exceed a threshold value;
   fluctuations of the rotational velocity within a time slot whose size is 770 milliseconds+−25%, never exceed a threshold value.

4. A system according to claim 1 wherein a rotational velocity fluctuation pattern is predetermined to be unsafe if at least one of:
   local fluctuations of the rotational velocity exceed a threshold value at least a predetermined number of times within a predetermined time window;

fluctuations of the rotational velocity (RPM) within a time slot whose size is 770 millisecond+−25%, exceed a threshold value at least a predetermined number of times within a predetermined time window.

5. A system according to claim 1, which also comprises a detonation and/or pre ignition retardation functionality which is activated responsive to said alert.

6. A system according to claim 1, wherein operating said turbo waste gate, responsive to said alert being provided, may be selectively omitted.

7. A system according to claim 1, wherein operating said system terminates or reduces detonation and/or pre ignition in the engine.

8. A system according to claim 1, wherein the detonation and/or pre ignition detector is operative to determine whether or not the rotational velocity is fluctuating over time to an extent predetermined to be unsafe, once every 70 milliseconds.

9. A system according to claim 1, wherein the system is incorporated in an aircraft wherein the engine is operative to airlift the aircraft, and wherein the control takes into account whether operating the system may lead to putting the aircraft in danger.

10. A system according to claim 1, and also comprising an external monitor recording the rotational velocity of the engine for provision to the detonation and/or pre ignition detector.

11. A system according to claim 10, comprising at least one of the following features:
    wherein the detonation and/or pre ignition detector resides on a computer which generates RPM and throttle information;
    wherein the detonation and/or pre ignition detector resides on a computer which generates RPM and throttle information and wherein the computer which generates RPM and throttle information comprises an engine controller;
    wherein said external monitor comprises an on-board computer controlling a vehicle motorized by the engine;
    wherein said external monitor comprises a computerized control center, which is remote from and which controls a vehicle motorized by the engine, and wherein said computerized control center receives engine rotational velocity information from an on-board RPM sampler.

12. A system according to claim 1, wherein said engine comprises a Rotax 914 engine.

13. A system according to claim 1, and also comprising an aircraft control station operative to control the structure capable of being airborne from the ground, and wherein said detonation and/or pre ignition detector resides within the aircraft control station.

14. A system according to claim 13, wherein the aircraft control station comprises a UAV ground control station operative to control a UAV and wherein the engine is operative for airlifting the UAV by generating rotational motion whose rotational velocity over time is monitored.

15. A system for advance detection of detonation and/or pre ignition in an engine, the system comprising:
    a detonation and/or pre ignition detector operative to provide an alert for impending detonation and/or pre ignition of an engine generating rotational motion whose rotational velocity over time is monitored, if the rotational velocity over a plurality of rotational cycles of said rotational motion fluctuates over time with a frequency which is predetermined to be unsafe; and
    a control coupled to said detonation and/or pre ignition detector and configured for operating a turbo waste gate responsive to said alert being provided.

16. A system according to claim 15, wherein the system is configured for operating with the engine, the engine comprising any one of: an internal combustion engine; a piston engine; a Rotax 914 engine.

17. A system according to claim 15, wherein said control is operative for opening said turbo waste gate responsive to said alert being provided.

18. A method for advance detection of detonation and/or pre ignition in an engine, the method comprising:
    providing an alert for impending detonation and/or pre ignition of an engine generating rotational motion whose rotational velocity over time is monitored, if the rotational velocity over a plurality of rotational cycles of said rotational motion fluctuates over time with a frequency which is predetermined to be unsafe; and
    operating a turbo waste gate responsive to said alert being provided.

19. A method according to claim 18, wherein operating said turbo waste gate comprises opening said turbo waste gate responsive to said alert being provided.

20. A method for operating aircraft with advance detection of detonation and/or pre ignition, the method comprising:
    providing a turbocharged engine airlifting a structure capable of being airborne by generating rotational motion whose rotational velocity over time is monitored, the engine comprises a turbo waste gate; and
    providing an alert for impending detonation and/or pre ignition of the engine, if the rotational velocity over a plurality of rotational cycles of said rotational motion fluctuates over time with a frequency which is predetermined to be unsafe
    operating the turbo waste gate responsive to said alert being provided.

21. A method according to claim 20, wherein operating said turbo waste gate comprises opening said turbo waste gate responsive to said alert being provided.

22. A computer program product, comprising a computer usable non-transitory medium having a computer readable program code embodied therein, said computer readable program code adapted to be executed to implement a method for advance detection of detonation and/or pre ignition in an engine, the method comprising:
    monitoring rotational velocity of an engine over time and over a plurality of rotational cycles;
    providing an alert for impending detonation and/or pre ignition of the engine generating rotational motion whose rotational velocity over time is monitored, if the rotational velocity over the plurality of rotational cycles of said rotational motion fluctuates over time with a frequency which is predetermined to be unsafe; and
    operating a turbo waste gate responsive to said alert being provided.

* * * * *